United States Patent [19]

Zimmerman, Sr. et al.

[11] 4,265,746

[45] May 5, 1981

[54] WATER TREATING APPARATUS AND METHODS

[75] Inventors: George M. Zimmerman, Sr., San Gabriel; Herman E. Menold, Santa Fe Springs, both of Calif.

[73] Assignee: Bon Aqua, Inc., Rancho, Calif.

[21] Appl. No.: 61,930

[22] Filed: Jul. 30, 1979

Related U.S. Application Data

[63] Continuation of Ser. No. 859,831, Dec. 12, 1977, abandoned.

[51] Int. Cl.³ ............................................. B01D 35/06
[52] U.S. Cl. .................................. 210/695; 210/222; 210/696; 204/155; 204/302
[58] Field of Search ............... 210/42 S, 57, 222, 223; 204/155, 186, 302

[56] References Cited

U.S. PATENT DOCUMENTS

| | | | |
|---|---|---|---|
| 2,652,925 | 9/1953 | Vermeiren | 210/222 |
| 3,170,871 | 2/1965 | Moriya | 210/222 |
| 3,186,549 | 6/1965 | Botstiber | 210/222 |
| 3,228,878 | 1/1966 | Moody | 210/222 |
| 3,511,776 | 5/1970 | Avampato | 210/222 |
| 3,567,026 | 3/1971 | Kolm | 210/222 |
| 3,608,718 | 9/1971 | Aubrey, Jr. et al. | 210/222 |
| 4,025,432 | 5/1977 | Nolan et al. | 210/222 |

FOREIGN PATENT DOCUMENTS

| | | | |
|---|---|---|---|
| 1963700 | 6/1971 | Fed. Rep. of Germany | 210/223 |
| 1416922 | 9/1965 | France | 210/42 S |

*Primary Examiner*—Benoit Castel
*Attorney, Agent, or Firm*—William P. Green

[57] ABSTRACT

An apparatus and method for treating fresh water by producing a magnetic field in proximity to a flow of such water within a water conduit having an electrically conductive portion connected electrically to earth. The magnetic field has north and south poles spaced apart in the direction of water flow, with its overall effective south magnetic polarity located upstream of its overall effective north magnetic polarity.

29 Claims, 5 Drawing Figures

U.S. Patent    May 5, 1981    4,265,746
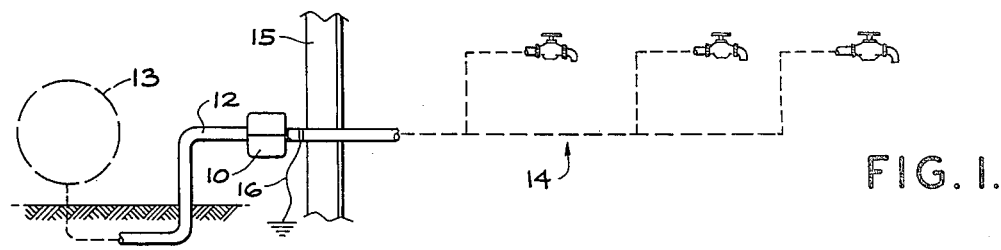
FIG. 1.
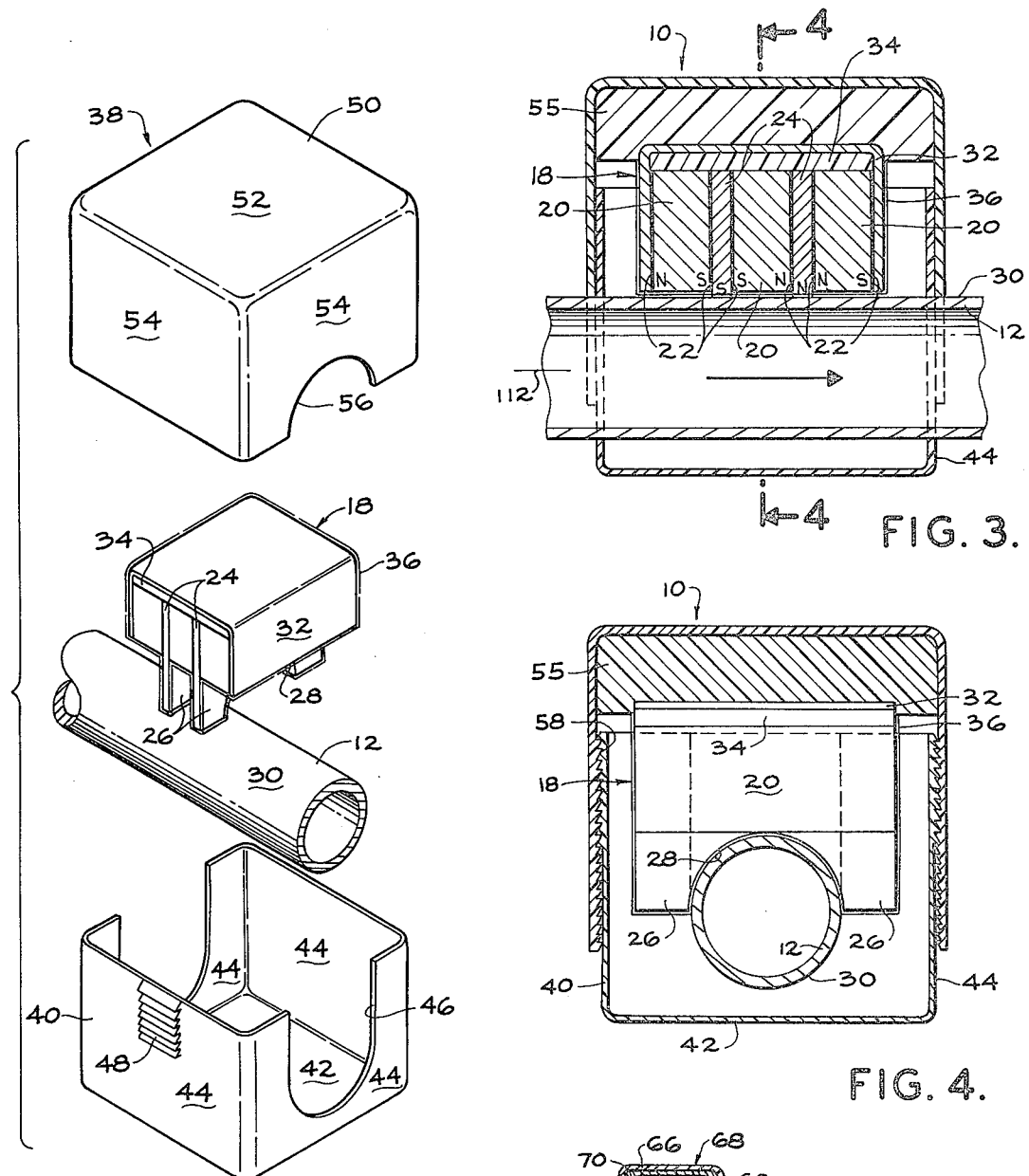
FIG. 3.
FIG. 4.
FIG. 2.
FIG. 5.

WATER TREATING APPARATUS AND METHODS

This is a continuation of application Ser. No. 859,831, filed Dec. 12, 1979, now abandoned.

BACKGROUND OF THE INVENTION

This invention relates to a novel apparatus and method for the treatment of fresh water, and more particularly to an apparatus and method for softening such water by the production of a magnetic field adjacent to a flow thereof under specified conditions.

The principal water softening processes in use today are the cold lime-soda process and the cation exchange process. They involve chemical reaction and exchange, respectively, to remove chemicals which make water "hard". Consequently, certain chemicals are consumed by the processes on a continuous basis while others are collected, resulting in a considerable on-going expense of chemical supply and disposal. The purchase price and maintenance cost of the apparatus required are also considerable.

Several devices of which I am aware have been proposed for the magnetic filtration or separation of metallic particles from liquids. These devices are disclosed in the following U.S. Patents:

| U.S. Pat. No. | Inventor | Issued |
| --- | --- | --- |
| 3,170,871 | Saburo Miyata Moriya | February 23, 1965 |
| 3,186,549 | D. W. Botstiber | June 1, 1965 |
| 3,567,026 | Henry H. Kolm | March 2, 1971 |
| 3,608,718 | William M. Aubrey, Jr., et al | September 28, 1971 |
| 4,025,432 | John J. Nolan & Peter G. Marston | May 24, 1977 |

Of those, Kolm and Aubrey relate primarily to the removal of metallic ore from a slurry, while the other three are directed to the removal of metallic impurities from a fuel system or a system of circulating fluid such as oil. The devices disclosed there are not suited to the softening of water.

U.S. Pat. No. 3,511,776, issued to Avampato, discloses a method and device for removing ions from sea water with the aid of applied magnetic fields. NaCl alone can be removed thereby, or other salts can be removed as well to yield "soft" water. The sea water is passed through transparent pipes where it is irradiated and subjected to magnetic fields whose poles are located essentially within a plane perpendicular to the direction of water flow. A high concentration of ions is thus produced, which ions are drawn to the outer annular regions of flow adjacent the side walls of the pipes. Water having a relatively low concentration of salts is then withdrawn from the axial regions of the respective pipes. After several repetitions of this process, fresh water of the desired purity and softness is obtained. This device is relatively complex and expensive for use in softening water.

SUMMARY OF THE INVENTION

The present invention relates to a novel method and apparatus for the softening or other treatment of fresh water by producing a magnetic field in proximity to a flow of such water within a water conduit having an electrically conductive portion connected electrically to earth. The magnetic field has north and south poles spaced apart in the direction of water flow, with its overall effective south magnetic polarity located upstream of its overall effective north magnetic polarity. This orientation of the magnetic field is critical to the softening operation.

The present invention can operate from the exterior of a conventional electrically conductive water supply pipe without disrupting the continuity of the pipe. A device may be easily installed by attachment to the exterior of the pipe. Furthermore, there does not seem to be a problem with scale buildup within the pipe because the device apparently does not extract chemicals from the water in the softening process.

The prior art devices known to me are basically irrelevant to an analysis of the present invention, and at any rate do not teach the application of the particular magnetic field required to soften water in this way. Most of the patents are also silent on the existence of an electrically conductive conduit portion connected to earth.

While not bound by any theory, it is believed that the instant invention operates by supplying electrons from an electrical ground to the undesired cations in the water, causing the cations to be transformed into whole molecules. The whole molecules are, of course, more stable than the ions. Water in this state exhibits the properties of soft water despite the fact that the substances extracted by other softening processes are still present. This is because those substances in the form of whole molecules are much more stable than their corresponding cations. For example, they do not deposit out freely in pipes and on plumbing fixtures and do not interfere with the solubility and effectiveness of detergents and other products. Furthermore, they are harmless from a health standpoint.

BRIEF DESCRIPTION OF THE DRAWING

The above and other features and objects of the invention will be better understood from the following detailed description of the typical embodiments illustrated in the accompanying drawing, in which:

FIG. 1 is a perspective view of a water softening system constructed in accordance with the teachings of the present invention, supplying treated water to a building;

FIG. 2 is a perspective, exploded view of the water softening device included in the system of FIG. 1;

FIG. 3 is a sectional view of the device included in the system of FIG. 1, taken along the vertical plane which includes the axis of the pipe;

FIG. 4 is a sectional view taken along the line 4—4 of FIG. 3; and

FIG. 5 is a sectional view of a second embodiment of a device constructed in accordance with the teachings of the present invention, taken along a vertical plane that includes the axis of the pipe.

DESCRIPTION OF THE PREFERRED EMBODIMENTS

Referring to the drawing by reference numerals, and particularly FIG. 1, a water treatment device 10 embodying the teachings of the present invention is shown attached to the exterior surface of a water pipe 12. The pipe 12 is supplied by a commercial water source 13 and feeds into a water distribution system 14 within a building 15. The water distribution system 14 comprises a plurality of faucets and other outlets. Pipe 12 has an electrically conductive portion in contact with the flow of water therethrough, which portion is connected to ground. In the most common case where pipe 12 is made entirely of a conductive material, such as steel, iron or copper, and the pipe is underground as it approaches the building, the pipe itself can provide the connection to ground. Otherwise, a ground wire 16 is required.

FIG. 2 illustrates the water treatment device 10, which structure includes a magnetic structure designated generally by the numeral 18. The structure 18 operates to produce the desired magnetic field in proximity to the pipe 12. It comprises three similar flat permanent magnets 20 (desirably ceramic magnets) of rectangular cross-section, each with its magnetic poles located at opposite rectangular sides 22. The permanent magnets 20 are arranged with their side surfaces 22 in parallel planes disposed transversely of the axis 112 of the pipe, and with similarly transverse flat pole members 24 laminated therebetween. The pole members 24 are constructed of a ferromagnetic material exhibiting a low magnetic retentivity under the conditions encountered in its use in the instant invention, including the magnetic field applied thereto by the permanent magnets 20. Specifically, the pole members 24 preferably have lower retentivity than the permanent magnets 20. The poles of the outer magnets are reversed from those of the inner magnet, causing the two side surfaces 22 abutting a particular pole member 24 to be of like magnetic polarity. This combination of the magnets 20 and the pole members 24 may be cemented together or otherwise retained in a laminated condition. The two pole members 24 are therefore heavily magnetized and are of opposite polarity. Each of the pole members 24 has an extension 26 projecting downwardly from the laminated region of the magnetic structure 18, with a partial cylindrical recess 28 positioned about a common axis which is perpendicular to the planes of the laminations. The recesses 28 are therefore able to engage the conventional water pipe 12 such that the outer surface 30 of the pipe is snugly received therein.

A relatively thin metallic strip 32 completes the magnetic circuit between the opposite poles at the two surfaces 22 nearest the respective ends of the laminated magnetic structure 18. The strip 32 is preferably constructed of a ferromagnetic material which exhibits a lower magnetic retentivity than the permanent magnets 20. A portion of strip 32 is coextensive with one of the side surfaces 22 and is cemented or otherwise retained thereto. From there, strip 32 passes over the top of the structure 18 and over the other side surface 22 where it is similarly fixed in place. The segment of strip 32 which passes over the top of the structure 18 is spaced therefrom to avoid magnetically short-circuiting the field of the pole members 24. An insulative member 34 fills that space to prevent a magnetic short circuit from attracted foreign particles. A thin coating 36 of electrically insulative material covers the entire magnetic structure 18.

The device described above can be seen to produce a magnetic field emanating from a pair of magnetic poles at members 24. The greatest magnetic flux density is adjacent the extensions 26 of pole members 24. A relatively strong constant magnetic field is thus produced adjacent the recesses 28 which receive pipe 12.

Referring now to FIGS. 2 through 4, the magnetic structure 18 is shown installed on the pipe 12 in the orientation which acts to soften water flowing therethrough in the direction indicated. The pipe 12 is received within the recesses 28 such that the pole member 24 which is magnetized to a south polarity is located upstream of the one magnetized to a north polarity. The operative portion 18 is protected from moisture and foreign matter and is held onto the pipe 12 by a two-piece interfitting housing 38. The housing 38 has a lower half 40 with a square base 42 and four vertical side walls 44. Two opposing side walls 44 are each provided with vertical slots 46 slightly wider than the pipe 12 and extending down from the top edge of those walls. The base of each slot 46 is semi-circular in shape to snugly receive the pipe 12. The two side walls 44 which are not slotted are provided at the top center of their outer surfaces with a series of horizontal teeth 48 displaced a small distance vertically from each other. The ribs 48 are for the releasable engagement of the lower half 40 of housing 38 with the upper half 50 of that housing.

The upper half 50 has a square top 52 and four downwardly extending vertical side walls 54. The upper half 50 is dimensioned to receive the magnetic structure 18 such that the extensions 26 of pole members 24 project downwardly therefrom. The magnetic structure 18 is secured within the upper half 50 by a mass of non-magnetic electrically insulative potting material 55 which is molded in place therebetween in the region adjacent the square top 52. Two opposing side walls 54 are provided with semi-circular recesses 56 aligned with the recesses 28 of pole members 24 for reception of the pipe 12. The other two side walls 54 are provided on their inner surfaces with a series of horizontal teeth 58 for engagement with the teeth 48 described above.

The upper half 50 of the housing 38 is sufficiently large to fit partially over and thereby engage the lower half 40 of that housing. The housing 38 may therefore be assembled by engaging the two halves about the pipe 12. The pipe 12 is received within the slots 46 of the lower half 40 and the recesses 56 of the upper half 50. The housing 38 is retained in this assembled condition by the frictional engagement of the outwardly projecting teeth 48 with the inwardly projecting teeth 58. If the pipe is made of a magnetically conductive material, the field emanating from the pole members 24 aids in holding the magnetic structure 18 against the pipe.

FIG. 5 illustrates a different embodiment of the invention. It differs from that described above principally in the use of two similar magnetic structures 60 and 62 rather than the single magnetic structure 18 of FIGS. 2 through 4. The structure 60 is identical to the structure 18, while the structure 62 differs therefrom by the addition of a pair of opposing outward-projecting end flanges 64. The flanges 64 serve to locate the structure 62 laterally within a somewhat enlarged upper half 66 of a housing 68, and to retain it vertically therein by frictional engagement with a series of teeth 70 on the interior wall of the upper half 66.

The magnetic structures 60 and 62 are located diametrically opposite one another about a pipe 72 which may be identical to the pipe 12, with the overall effective south pole of each structure upstream of its overall effective north pole. This configuration is used when additional magnetic field strength and greater field uniformity is desired.

The housings 38 and 68 may be made of any durable material, although a high grade of plastic is preferable due to its moisture and corrosion resistive qualities. It is also non-magnetic and will not interfere with the magnetic field created.

In operation, the water which flows within the pipes 12 and 72 past the location of the device 10 is exposed to the overall effective magnetic field of the device. The water passes from a region of predominant south magnetic polarity to one of predominant north magnetic polarity, thus moving generally against the magnetic lines of force. This relationship between the water flow and the magnetic polarity has been found to be necessary to the water softening operation of the device 10. It has also been found that the instant invention will function only when the water pipe 12 has its electrically conductive portion in contact with the flow of water and electrically connected to earth.

While certain specific embodiments of the invention have been disclosed as typical, the invention is of course not limited to these particular forms, but rather is applicable broadly to all such variations as fall within the scope of the appended claims. As an example, it is contemplated that an electromagnet capable of producing the desired field may be used in place of the permanent magnets described above with no loss of effectiveness. The only limitation would be that the device be located near a source of electrical energy.

We claim:

1. A water system for supplying treated water, comprising:
    a fluid conduit having an electrically conductive portion connected electrically to earth;
    fresh water flowing through said conduit in a predetermined direction; and
    means in proximity to said conduit for producing a magnetic field having north and south poles spaced apart in the direction of water flow;
    said magnetic field being oriented to have its overall effective south magnetic polarity located upstream of its overall effective north magnetic polarity.

2. The device as recited in claim 1, wherein said conduit is a water pipe and said means for producing a magnetic field is adapted to engage the exterior surface of said pipe in a region where the surface is continuous and uninterrupted.

3. A water system as recited in claim 1, wherein said means for producing a magnetic field comprises:
    at least one permanent magnet at the outside of said conduit with north and south poles spaced apart in the direction of water flow and with said south pole upstream of the north pole; and
    two ferromagnetic elements at opposite axial sides of said permanent magnet and projecting into close proximity to an outer surface of said conduit.

4. A water system as recited in claim 1, wherein said means for producing a magnetic field comprises a plurality of permanent magnets arranged linearly along the direction of water flow in alternating polarities such that similar poles of any two adjoining magnets face generally axially toward each other.

5. A water system as recited in claim 4, including ferromagnetic elements received at locations spaced apart in the direction of water flow and between pairs of said permanent magnets and received in close proximity to an outer surface of said conduit.

6. A water system as recited in claim 5, wherein said means for producing a magnetic field includes ferromagnetic means providing a flux return path between different ones of said magnets at a location spaced outwardly from said conduit.

7. A water system as recited in claim 6, wherein said ferromagnetic elements contain recesses receiving portions of said conduit.

8. A water system as recited in claim 1, in which said means include a first permanent magnet at the side of said conduit having north and south poles spaced apart in the direction of water flow, with said south pole being upstream of the north pole; a second permanent magnet upstream of said first permanent magnet and having a south pole opposite the south pole of said first magnet and a north pole upstream thereof; a third permanent magnet downstream of said first magnet and having a north pole opposite the north pole of said first magnet and a south pole downstream of said north pole of the third magnet; a first ferromagnetic element received axially between said first and second permanent magnets and forming a net south pole projecting radially inwardly beyond said first and second permanent magnets and into close proximity with said conduit; and a second ferromagnetic element received axially between said first and third permanent magnets and forming a net north magnetic pole projecting radially inwardly beyond said first and third magnets and into close proximity with said conduit.

9. A water system as recited in claim 8, including a ferromagnetic flux return element defining a flux return path and having end portions received at an upstream side of said second magnet and a downstream side of said third magnet respectively, and having a connector portion joining said end portions at a location spaced outwardly from the conduit.

10. A water system as recited in claim 9, including a layer of insulating material interposed radially between radially outer sides of said magnets and ferromagnetic elements and said connector portion of said flux return element.

11. A water system as recited in claim 10, including a housing element received about and containing said magnets and said flux return element and having an open side placed against said conduit, and means retaining said housing element and its contents against the conduit.

12. A water system as recited in claim 10, including a housing element received about and containing said magnets and said flux return element and having an open side placed against said conduit, and a second housing element received at an opposite side of the conduit and having an open side facing the conduit and having teeth engaging coacting teeth on the first housing element to retain the two housing elements together about the pipe.

13. A water system for supplying treated water, comprising:
    a fresh water source;
    a water distribution system for said water source;
    a water conduit connected to said distribution system for the flow of water therethrough from said source in a predetermined direction and having an electrically conductive portion connected electrically to earth; and
    means in proximity to said conduit for producing a magnetic field having north and south poles spaced apart in the direction of water flow;
    said magnetic field being oriented to have its overall effective south magnetic polarity located upstream of its overall effective north magnetic polarity.

14. The method of treating water which comprises:
    passing fresh water through a fluid conduit having an electrically conductive portion connected electrically to earth; and
    subjecting the water to a magnetic field having north and south poles spaced apart in the direction of water flow, said magnetic field being oriented to have its overall effective south magnetic polarity located upstream of its overall effective north magnetic polarity.

15. A device for treating fresh water flowing through a conduit comprising:
   a first housing element to be received at a first side of said conduit;
   means contained in said housing element at a location to be received in proximity to said conduit for producing a magnetic field at the location of the conduit wall with spaced poles;
   a part to be received at a side of the conduit opposite that at which said housing element is received so that the housing element and part may be moved relatively toward one another and against the conduit; and
   detenting connector means on said housing element and said part interengageable as a result of movement of the housing element and part relatively toward one another to detent the housing element and part against relative separation and thus retain them on the conduit.

16. A device as recited in claim 15, in which said detenting connector means include teeth on said housing element and said part interengageable in connecting relation as a result of movement of the housing element and part relatively toward one another.

17. A device as recited in claim 15, in which said housing element has two spaced walls, and said part has two spaced walls received adjacent said two walls of the housing element respectively, said walls of the housing element and part being slightly resiliently deflectable and having teeth which are resiliently urged toward one another and are deflectable to pass one another as the housing element and part move relatively toward each other, and which then are resiliently urged to a holding relation locking the part and housing element against relative separation and about the conduit.

18. A device as recited in claim 15, in which said housing element has two spaced walls containing recesses for partially receiving and embracing said conduit when retained thereagainst.

19. A device as recited in claim 18, in which said part is a second housing element for closing said first housing element and containing spaced walls with recesses for partially receiving and embracing said conduit.

20. A device as recited in claim 19, in which said two housing elements are formed of an insulative material and have two pairs of walls received adjacent one another and carrying resiliently deflectable interengageable teeth serving as said detenting connector means for locking the housing elements against relative separation.

21. A device as recited in claim 15, in which said part has a recess for partially receiving and embracing said conduit when the housing element and part are secured together.

22. A device for treating fresh water flowing through a conduit comprising:
   a first permanent magnet to be received at a side of the conduit and having north and south poles which are spaced apart in the direction of water flow through the conduit;
   a second permanent magnet received at one axial side of the first permanent magnet and having north and south poles spaced apart in the direction of fluid flow, with the south pole of the second magnet facing axially toward the south pole of the first magnet;
   a third permanent magnet located at a second axial side of said first magnet and having magnetic poles spaced apart in the direction of water flow, with the north pole of the third magnet facing axially toward the north pole of said first magnet;
   a first ferromagnetic element received axially between said first and second magnets and forming a net south pole projecting radially inwardly beyond said first and second magnets for reception in close proximity to the conduit; and
   a second ferromagnetic element received axially between said first and third magnets and forming a net north pole projecting radially inwardly beyond said first and third magnets for reception in close proximity to said conduit;
   there being no ferromagnetic parts of said device other than said first and second ferromagnetic elements which project inwardly as far as said first and second ferromagnetic elements.

23. A device for treating fresh water flowing through a conduit comprising:
   a first permanent magnet to be received at a side of the conduit and having north and south poles which are spaced apart in the direction of water flow through the conduit;
   a second permanent magnet received at one axial side of the first permanent magnet and having north and south poles spaced apart in the direction of fluid flow, with the south pole of the second magnet facing axially toward the south pole of the first magnet;
   a third permanent magnet located at a second axial side of said first magnet and having magnetic poles spaced apart in the direction of water flow, with the north pole of the third magnet facing axially toward the north pole of said first magnet;
   a first ferromagnetic element received axially between said first and second magnets and forming a net south pole projecting radially inwardly beyond said first and second magnets for reception in close proximity to the conduit;
   a second ferromagnetic element received axially between said first and third magnets and forming a net north pole projecting radially inwardly beyond said first and third magnets for reception in close proximity to said conduit; and
   a flux return path structure having two end portions received adjacent the north pole of said second magnet and the south pole of said third magnet and having a connector portion joining said end portions at a location spaced from the conduit.

24. A device as recited in claim 23, including an insulating material interposed radially between said connector portion of said flux return path structure and radially outer sufaces of the three magnets.

25. A device as recited in claim 24, including a housing element received about and containing said magnets and said ferromagnetic elements and said flux return path structure and having an open side at which said ferromagnetic elements are receivable in close proximity to the conduit.

26. A device as recited in claim 25, including a part receivable at said open side of said housing element with said conduit therebetween and movable toward said housing element, and means for securing said housing element and part together and about the conduit.

27. A device as recited in claim 25, including a part receivable at said open side of said housing element with said conduit therebetween and movable toward said housing element, and detenting means on said housing element and said part detenting them against separation as a result of movement of the housing element and part relatively toward one another and about the conduit.

28. A device as recited in claim 27, in which said part forms a second housing element having an open side facing toward said first mentioned housing element, said two housing elements being formed of non-conductive material and having walls with recesses for partially receiving and embracing opposite sides of said conduit, said two housing elements having resiliently deflectable wall portions with teeth forming said detenting means engageable with one another as a result of movement of the two housing elements toward one another to lock the housing elements against relative separation.

29. A device as recited in claim 23, in which said first and second ferromagnetic elements project radially inwardly farther than said end portions of said flux return path structure.

* * * * *